US012555713B2

(12) United States Patent
Drofenik et al.

(10) Patent No.: US 12,555,713 B2
(45) Date of Patent: Feb. 17, 2026

(54) MEDIUM FREQUENCY TRANSFORMER WITH PARALLEL WINDINGS

(71) Applicant: HITACHI ENERGY LTD, Zürich (CH)

(72) Inventors: Uwe Drofenik, Zürich (CH); Gernot Riedel, Baden-Rütihof (CH); Thomas Bernhard Gradinger, Aarau Rohr (CH)

(73) Assignee: HITACHI ENERGY LTD, Zürich (CH)

( * ) Notice: Subject to any disclaimer, the term of this patent is extended or adjusted under 35 U.S.C. 154(b) by 926 days.

(21) Appl. No.: 17/783,153

(22) PCT Filed: Dec. 4, 2020

(86) PCT No.: PCT/EP2020/084710
§ 371 (c)(1),
(2) Date: Jun. 7, 2022

(87) PCT Pub. No.: WO2021/115966
PCT Pub. Date: Jun. 17, 2021

(65) Prior Publication Data

US 2023/0016771 A1 Jan. 19, 2023

(30) Foreign Application Priority Data

Dec. 12, 2019 (EP) .................................... 19215570

(51) Int. Cl.
*H01F 27/04* (2006.01)
*H01F 27/02* (2006.01)
(Continued)

(52) U.S. Cl.
CPC ........... *H01F 27/04* (2013.01); *H01F 27/022* (2013.01); *H01F 27/2823* (2013.01); *H01F 27/321* (2013.01)

(58) Field of Classification Search
CPC .... H01F 27/04; H01F 27/022; H01F 27/2823; H01F 27/321; H01F 2027/2857; H01F 27/29; H01F 27/32; Y02B 70/10
(Continued)

(56) References Cited

U.S. PATENT DOCUMENTS 2,521,513 A * 9/1950 Gray .................. H01F 27/2847 315/99
3,244,960 A 4/1966 Stevens et al.
(Continued)

FOREIGN PATENT DOCUMENTS

CN 202650770 U 1/2013
CN 107424797 A 12/2017
(Continued)

OTHER PUBLICATIONS

International Search Report and Written Opinion of the International Searching Authority, PCT/EP2020/084710, mailed Mar. 9, 2021, 21 pages.

(Continued)

*Primary Examiner* — Tuyen T Nguyen
(74) *Attorney, Agent, or Firm* — Sage Patent Group

(57) ABSTRACT

A medium frequency transformer for a DC/DC converter includes: a core having an air gap and a coil surrounding a core section and having a plurality of windings; a medium voltage electric insulation, surrounding the coil each winding including a first and second termination and a conductor wound around a portion of the core in at least one turn between the first and second termination; a plurality of terminals provided outside the insulation, each connected to a different first termination by one of a plurality of connectors a channel extending from an outside of the insulation into and at least partially through said electric insulation, wherein the connectors extend through the channel and are
(Continued)

insulated against one another by means of a low voltage insulation within the channel. The second terminations are connected to one another within or inside the insulation and connected to a second terminal outside of the insulation by a second connector.

19 Claims, 4 Drawing Sheets

(51) Int. Cl.
*H01F 27/28* (2006.01)
*H01F 27/32* (2006.01)

(58) Field of Classification Search
USPC ........ 336/55–62, 90, 92, 192, 200, 225, 232
See application file for complete search history.

(56) References Cited

U.S. PATENT DOCUMENTS

| | | | |
|---|---|---|---|
| 3,517,361 | A | 6/1970 | Reifel et al. |
| 4,048,593 | A | 9/1977 | Zillman |
| 5,504,469 | A | 4/1996 | McGrane |
| 2010/0295647 | A1 | 11/2010 | Maruyama et al. |
| 2018/0159435 | A1 | 6/2018 | Klaes |
| 2018/0277297 | A1 | 9/2018 | Winslow |
| 2019/0027301 | A1 | 1/2019 | Lee et al. |
| 2019/0088411 | A1 | 3/2019 | Zhi et al. |

FOREIGN PATENT DOCUMENTS

| | | | |
|---|---|---|---|
| CN | 207217259 | U | 4/2018 |
| CN | 207517482 | U | 6/2018 |
| EP | 0707533 | B1 | 11/1998 |
| EP | 2075806 | A1 | 7/2009 |
| EP | 3159904 | A1 | 4/2017 |
| EP | 2929551 | B1 | 5/2017 |
| EP | 3796528 | A1 | 3/2021 |
| EP | 3796537 | A1 | 3/2021 |
| GB | 2030785 | A | 4/1980 |
| IN | 102843041 | A | 12/2012 |
| JP | H09322552 | A | 12/1997 |
| JP | 2001275276 | A | 10/2001 |
| JP | 2009254118 | A | 10/2009 |
| JP | 2011228247 | A | 11/2011 |
| JP | 2012231616 | A | 11/2012 |
| JP | 2015088758 | A | 5/2015 |
| JP | 2016510948 | A | 4/2016 |
| WO | 2018141092 | A1 | 8/2018 |

OTHER PUBLICATIONS

IEEE Standards Association, "IEEE Standard for Standard Terminal Markings and Connections for Distribution and Power Transformers", IEEE Power & Energy Society, Transformers Committee, Feb. 7, 2012, New York, NY, 56 pages.

Japanese Office Action, Japanese Patent Application No. 2022-535683, mailed Jul. 31, 2023, 5 pages.

Chinese Notice of Allowance and Translation, Chinese Application No. 202080083908.7, mailed Oct. 1, 2024, 6 pages.

* cited by examiner

MEDIUM FREQUENCY TRANSFORMER WITH PARALLEL WINDINGS

CROSS-REFERENCE TO RELATED APPLICATIONS

This application is a 35 U.S.C. § 371 national stage application of PCT International Application No. PCT/EP2020/084710 filed on Dec. 4, 2020, which claims priority to European Patent Application No. 19215570.3, filed Dec. 12, 2019 the disclosures and content of which are incorporated by reference herein in their entireties.

TECHNICAL FIELD

The disclosure pertains to the field of power electronics. It relates to a transformer, in particular a medium frequency transformer for a resonant DC/DC converter or a dual active bridge DC/DC in accordance with the independent patent claim.

BACKGROUND

Transformers which deal with high current (several 100 Amps and more, in particular above 200A) at high frequencies of several kilohertz (in particular above 3 kHz or much higher) are very difficult to build with low-cost and/or off-the-shelf components due to several effects which are negligible at lower frequencies, in particular at frequencies below 1 kHz, and/or for low currents, in particular currents below 100 A. Typical applications involving such high frequencies and/or currents are medium frequency transformers (MFT) as frequently used in solid state transformers (SST), especially for SSTs configured as AC/DC converters for connected distributed power to the medium voltage (MV) grid as in Electric vehicle (EV) fast charging
Photovoltaic (PV) solar
Battery energy storage systems (BESS).
Wind onshore and offshore.
Datacenter but also transformers without MV insulation requirements as frequently used in high-power low voltage DC/DC converters with galvanic insulation which are required in the charging pole of EV fast chargers. Two particular examples of such DC/DC converters are dual active bridge converters, as exemplary described in Swiss patent application publication CH 707 533 A2 or U.S. patent application publication CH 2018/0159435 A1, both of which are hereby included by reference in their entirety; and resonant DC/DC converters as exemplary described in PCT patent application WO 2018/141092 A1, which is hereby also included by reference in their entirety.

For keeping high-frequency losses in transformer coils small, one way is to employ litz wire to form the coils' windings. While litz wire is several times more expensive than solid copper wire, it may be purchased "off-the-shelf" for AC currents up to 100-200 A (root-mean-square, rms). Litz wire consists of a large number of transposed strands generally made from copper, and is available off-the-shelf in total cross-sections up to 0.5 $cm^2$ which allows maximum current in the range of 100-200 $A_{rms}$ (assuming a filling factor of 0.8 and a current density of 2.5-5 $A/mm^2$). Larger currents, as they are typical in above listed applications, require larger cross sections and will be increasingly difficult to bend. Litz wire is usually not made from aluminum because with aluminum it is extremely difficult to reliably contact all strands at a wire terminal (e.g. 900 strands of 0.2 mm diameter each in above mentioned copper litz wire). Copper litz wire is at least 2-4 times more expensive than solid copper, and copper is around 3 times more expensive than aluminum. For higher currents (>100 A) as they are typical in the applications listed above, several copper litz wires have to be paralleled, which may result, due to stray flux between the paralleled wires, in circulating currents, which can increase the losses significantly.

For optimization and/or minimization of manufacturing effort and required resources, aluminium foil windings as commonly employed in 50 Hz transformers might be a favoured choice for the coils. At high frequency, the winding losses in a foil increase significantly due to skin- and proximity effects. If a single foil is employed, the frequency defines a required foil thickness, a desired or required current defines a foil height, and this results in a transformer height. For large current and high frequency, the transformer shape will thus strongly deviate from a cube-shape which results much higher weight, core losses, and increased requirement in resources and effort (higher core volume required).

If parallel foils are employed, foil height could be reduced, but due to the stray field between paralleled foils strong circulating currents may be induced, which increase losses significantly (due to similar effects as with paralleled litz wire).

In both designs, copper litz wire and foil, a major problem is circulating currents between the parallel conductors which increase winding losses, often significantly, thereby reducing a transformer power rating, and/or significantly increase a transformer cost (USD/KW). In prospective distributed energy applications like EV fast charging, PV solar, battery energy storage systems, wind, or datacentre, the medium frequency transformer (MFT) is a key component. For higher currents (in particular above 100 A), simply scaling up 50/60 Hz technology and/or employing off-the-shelf litz wire or low-cost foil wire results in huge losses due to high-frequency induced circulating currents which reduce transformer performance significantly.

Generation of circulating currents, in particular in a configuration of two windings connected in parallel, with each winding comprising a plurality of turns, may be understood as follows: Each of the turns is exposed to a magnetic stray field, e.g., in a windings window formed by a core of the transformer. Parallel litz wires forming individual windings which are connected at input and output terminals of the transformer form a loop which is exposed to the magnetic stray field. The magnetic stray field changes with the MFT's operating frequency, resulting in a voltage which drives a circulating current in this loop. The circulating current adds to a nominal current in the MFT which may result in one litz wire carrying more than half of the nominal current, and the parallel one carrying accordingly less than half of the nominal current. If the circulating current is large enough, one litz wire can carry more than a total nominal current, and then the parallel one carries a negative (180° phase-shifted) current. In this way, not only is a total available copper cross section effectively reduced by 50%, but additional losses are introduced, and a maximum output power of the MFT is reduced by a factor two or more.

State-of-the-art solutions to limit circulating currents require extra components, higher manufacturing effort and additional space, and may lead to additional problems. One state-of-the-art solution, transposition of wires or foils connected in parallel, as for example provided by parallel wires twisted around one another or otherwise intertwined or interlaced, requires additional manufacturing effort, especially for foil windings, leads to an increased effective wire-length, exhibits limited efficiency in MFTs with only a few winding turns and may lead to high voltage insulation challenges, e.g. due to geometric inhomogeneities in a vicinity of transposition locations. Alternatively, common-mode filters may be added between the parallel wires or foils. However, this requires additional components, may thus lead to higher cost and higher manufacturing effort, and require additional space and/or other resources.

One promising suggestion that has recently been made is to provide an appropriate impedance element, in particular a capacitor or inductor depending on a type and/or class of converter in connection with which the transformer is used, in series with each of the parallel windings, as described in European patent applications EP 19198713.0 and EP 19198718.9, and in more detail further below. Such impedance elements may at least partially replace impedance elements required anyway by a converter topology, and efficiently suppress circulating currents, and are thus sometimes referred to as split impedance elements, in particular as split resonant capacitors or split energy transfer inductors.

However, when using split impedance elements, difficulties arise when it comes to adequate design of an appropriate (electric) insulation.

If the split impedance elements are to be provided in close (physical) proximity of an ending or termination of respective transformer windings, the split impedance elements need to be enclosed in an insulation surrounding and/or encapsulating the coil.

Two basic types of such insulation exist: solid insulation and liquid insulation.

Solid insulation, also referred to as dry-cast insulation, may be provided by casting the coil into an electrically insulating material, which may subsequently be cured, e.g. by polymerization, in particular a resin. Enclosing split impedance elements in the solid insulation will significantly increase a complexity of said insulation, especially in terms of cost and manufacturability. Furthermore, it will make maintenance and/or replacements of the split impedance elements difficult if not impossible. It also makes it difficult for a system designer to modify impedance values, which may, e.g., be desirable for fine tuning.

Liquid insulation may be provided by submerging the coil, and often the whole transformer, in an insulating liquid contained in a tank, vessel, or other kind of container. Similar problems and difficulties arise in this case. To begin with, the impedance elements would need to be located inside the container and may thus not easily be accessed, replaced, or fine-tuned. Furthermore, if the impedance elements are capacitors, for acceptable lifetime expectancy, the capacitors usually need to be kept at a much lower temperature than the materials of inductive components. This is difficult to achieve if the capacitors are housed in the same tank as the MFT.

Generally, if the windings which form the coil are connected to individual capacitors by connectors, one has to guarantee that connecting subconductors forming such connectors don't have unacceptable high-frequency losses (not only concerning efficiency but also in terms of over-temperature), are insulated against each other, and are insulated for medium voltage against MFT components such as core and, if present, liquid container that are on ground or on low voltage potential. This could be achieved by providing individual windings with a so called terminal insulation for each connecting subconductor. However, this would make the design very complex, bulky and expensive. In the context of the present disclosure, medium voltage may, in particular, refer to voltage range between 1 kV and 100 kV. Medium voltage insulation may, in particular, be configured to withstand voltages within the medium voltage range, in particular voltages of up to 100 kV, across the electric insulation, in particular across a thickness of the insulation. The medium voltage insulation may, in particular, be configured to not withstand any higher voltages, in particular high voltages substantially larger than 100 kV. However, the medium voltage insulation may nevertheless be configured to withstand lightning impulse, in particular voltages of up to 200 kV occurring during and/or due to lightning impulse. In the case of solid insulation, this typically requires thicknesses of the electrically insulating material of at least 5 mm, preferably at least 10 mm, most preferably at least 20 mm to be provided between any two points that need to be electrically insulated against one another.

SUMMARY

It is an object of the present disclosure to disclose a transformer, in particular for a medium frequency transformer for a resonant DC/DC converter or a dual active bridge DC/DC converter, said transformer having a plurality of windings which may be connected in parallel with an impedance element connected in series with each winding, and for which efficient electric insulation may be provided with reasonable manufacturing effort.

This object is achieved by a transformer in accordance with the independent patent claim. Further exemplary embodiments are evident from the dependent claims and the following description in combination with the accompanying drawings.

A transformer, in particular a medium frequency transformer, in particular for a resonant DC/DC converter or a dual active bridge DC/DC converter, in accordance with the embodiments disclosed herein comprises a) a core, preferably having an air gap;

b) a first coil surrounding a first section of the core;

c) an electric insulation, preferably a medium voltage insulation, surrounding the first coil;

d) wherein the first coil comprises a plurality of M>1 windings;

e) each of the plurality of M windings comprising
   i) a first termination and a second termination,
   ii) a conductor wound around the first portion of the core in at least one turn between the first and second termination, f) a plurality of M first terminals provided on an outside of the insulation, each of said first terminals connected to a different one of the first terminations by one of a plurality of M first connectors, thus connecting each first terminal to a respective first termination; the transformer further comprising:

g) a first channel extending from an outside of the electric insulation into and at least partially through said electric insulation, wherein the plurality of M first connectors extend through the first channel; wherein h) the plurality of M first connectors are insulated against one another by means of a low voltage insulation within the channel, and wherein preferably no medium voltage and/or high voltage insulation is present between any of the first connectors.

The transformer core may in particular be made from magnetic material with a high magnetic permeability, in particular a ferroelectric or ferrielectric material, and comprise a first limb, extending in a first direction which may correspond to the lateral direction, a second limb, in particular extending in the first direction, a first yoke extending in a second direction, in particular perpendicular to the first direction, and a second yoke, in particular extending in the second direction. A core window may extend through the core in a third direction perpendicular to both the first and second directions. Preferably, dimensions $D_1$ and $D_2$ of the core in the first and/or second directions are significantly larger than a dimension $D_3$ of the core in the third direction, i.e. $D_1>D_3$ and/or $D_2>D_3$, preferably with $D_1>>D_3$ and/or $D_2>>D_3$ so that the core may be regarded as essentially planar; albeit with a non-zero dimension $I_3$ of the core window in the lateral direction, in general with $I_3 \approx D_3$, and frequently with $I_3=D_3$. Both the first and second limb may extend from the first to the second yoke and vice versa, and surround the core window.

In transformer designs generally referred to as shell type, the first and second limb may extend between the first and second yoke and vice versa, and surround the core window. A third limb may extend between the first and second yoke, in particular in the first direction; and between the first and the second limb, so that the core window is divided into a first sub-window and a second sub-window, preferably with both sub-windows extending through the core in the third direction.

The core may in particular be a closed core, i.e. no gaps, in particular no air gaps, are present within any of the limbs or yokes, nor between any pair of limb and yoke, so that the magnetic flux linking the primary and secondary windings travels—at least essentially—entirely within the magnetic material which constitutes the core, so that—at least essentially—no loss of magnetic flux through air occur. The core—rather than being a closed core—may alternatively comprise one or more core gaps filled with a material having a magnetic permeability significantly lower than the magnetic material of the core, in general air and/or synthetic material, in particular plastics. A number $N_{gap}$ of core gaps provided in one limb may be considered as separating said limb into $N_{gap}+1$ portions. Neighboring portions of the limb may be spaced apart by a distance $d_{core}$, which may, but need not, be equal for all core gaps.

The coil may, in particular, surround a straight first section of the core, which section may in particular be a section of a limb, in particular the first limb. The coil may, in particular, surround at least essentially the whole first limb.

The coil comprises a plurality, i.e., at least two windings which may be connected in parallel, and may thus, in particular, form a primary winding of the transformer.

A coil for a transformer in accordance with the embodiments disclosed may, in particular, be obtained by: providing a plurality of M>1 conductive foil strips, each having a first ending and a second ending; stacking the plurality of conductive foil strips to obtain a foil strip stack having a first ending and a second ending, wherein an insulating layer, in particular a low voltage insulation layer, is provided between any two adjacent foil strips; and coiling up the foil strip stack from the second end.

One possible starting point for the obtaining the coil are a plurality of M of conductive foil strips, made from an electrically conducting foil, in particular aluminum foil. Each foil strip may have a width w, in particular in a first or lateral direction; a length l, in particular in a second or longitudinal direction preferably perpendicular to the first direction; and a thickness d, in particular in a third direction preferably perpendicular to both the first and second directions. All foil strips may have at least essentially identical dimensions. Width and length of each foil strip may be both much larger than thickness, i.e. w>>d and l>>d. Each foil strip may thus be at least essentially rectangular, or at least have a rectangular basic form. Strips may also be elongate, i.e. l>w, preferably l>>w. Each foil strip has a first ending and a second ending with respect to the longitudinal direction. Each foil strip may have an effective cross section of w·d, which may be at least essentially constant along said foil strip's length l.

In a first step, the foil strips are stacked, with their first endings and the second endings positioned above one another. An electric insulation is provided between any two adjacent or neighboring foil strips. Said electric insulation may, in particular, be provided by a separate and/or additional electrically insulating layer stacked and/or placed between any two adjacent or neighboring foil strips. The separate and/or additional electrically insulating layer may have at least essentially the same width w and length/as the foil strips. Further additional electrically insulating layers may be provided at a bottom and on top of the stack. Alternatively or additionally, the electric insulation also be formed by a part of one or both of the adjacent or neighboring foil strips, which may comprise a conductive layer laminated onto a foil insulation layer, or laminated between two foil insulation layers. The electric insulation provided between any two adjacent or neighboring foil strips may be a low voltage insulation. Such low voltage insulation may be configured to withstand a voltage of up to 50V, 100V, 250V or 500V across the electric insulation, in particular across a thickness of the insulation. The low voltage insulation may in particular be configured to not withstand any voltages, in particular medium or high voltages, i.e. electrical breakdown and/or dielectric breakdown will occur at least with a high probability, in particular a probability of above 20%, 50%, 80% or 90% when voltages above 50V, 100V, 250V or 500V, in particular substantially above 50V, 100V, 250V or 500V are applied across the electric insulation, in particular across the thickness of the insulation. Alternatively or in addition, a thickness of the low voltage insulation may, in particular, be below 5 mm, below 2.5 mm, below 1 mm, or below 0.5 mm.

A resulting stack of foil strips may have at least essentially the same width w and length/as the foil strips, and a total thickness of D, wherein w>>D and/or l>>D may hold. The stack may thus also be at least essentially rectangular, or at least have a rectangular basic form. As with the individual foil strips, the stack has a first ending and a second ending with respect to the longitudinal direction, with the first ending of the stack located near the first endings of the foil strips and the with the second ending of the stack located near the second endings of the foil strips; or, in other words, with the first ending of the stack located closer to the first endings of the foil strips than to the second endings, and vice versa.

In a further step, the second endings of all the conductive foil strips may be connected together, in particular for simple, fast and secure electric connection of the finished coil to and/or within a converter circuit. Preferably, all the second endings may be connected directly, in particular in a star-like topology, in particular with all the second endings connected to a single connector. Alternatively, the second endings may be connected in series.

In a further step, a plurality of M first connectors may be provided, i.e. one connector for each foil strip. Each one of the plurality of M connectors is connected to a different one of the plurality of M conductive foil strips. The connectors may be formed integrally with each foil strip, e.g. by or from an additional foil strip section which extends beyond the second ending of the foil strip, and has been folded and/or twisted to form a cable- or wire-like conductor. More generally, the connectors may comprise any kind of means provided or formed at and in contact with the second ending, and allowing for connection to any kind of conductor, in particular a terminal, preferably without any reduction in cross section below the one of the respective foil strip.

In a further step, the stack of foil strips is coiled up, scrolled up or rolled up, beginning at and/or from the second ending, in and/or along the longitudinal direction, i.e. preferably at least essentially parallel to the longitudinal direction, to obtain a coil having a number $N_{turn}$ of turns. Said coil may have a shape which at least essentially resembles a cylinder shell, barrel or jacket, having a height h at least approximately equal to the width w of the foil strips. The coil may further have or define a central opening, which may have an at least essentially cylindrical shape, wherein a longitudinal axis of said cylindrical shape may extend at least essentially parallel to the lateral direction. The central opening may, in particular, be configured to receive a section of the transformer core, in particular a limb, such that the coil surrounds said section as described above.

The plurality of M conductive foil strips thus forms a plurality of M windings, with the first and second ending of each foil strip representing the first and second termination, respectively. All windings may be connected in parallel at their second endings, and may be regarded as intertwined, in particular within one another. Alternatively, the windings may be regarded as forming interdigitated spirals, which are connected to one another at their inner ends. The windings are, however, free of transpositions, and are, in particular, not twisted around one another.

A coil or a winding configuration of or for a transformer in accordance with some of the embodiments described herein may thus comprise a pair of windings, said pair of windings comprising a first winding made of conductive foil strip and comprising a first plurality of turns surrounding one another, a second winding made of conductive foil strip and comprising a second plurality of turns surrounding one another, with each turn of the first plurality of turns adjacently surrounded by a turn of the second plurality of turns; wherein innermost endings of the first and second windings are electrically connected at a first terminal, wherein a first and a second connector are provided at an outermost ending of and in contact with the first and second winding, respectively.

The coil or winding configuration may comprise a further winding intertwined with the first and second winding and comprising a further plurality of turns surrounding one another.

The first, second and any further windings may be electrically connected, in particular directly electrically connected, at innermost endings, in particular via a second connector, and may further be otherwise electrically isolated from one another, or, in other words, the first and second windings may be electrically isolated from one another except for said connection at the innermost ending of the windings.

Such a winding configuration may, in particular, be produced in accordance with a method as outlined above or certain method variants thereof, wherein the first and second windings are formed by a first one and a second one of the plurality of the M>1 conductive foil strips, with the innermost endings of the first and second winding formed by the second endings of said foil strips, and the outermost endings of the first and second winding formed by the 1st endings of said foil strips.

A coil for a transformer in accordance with the some of the embodiments described herein may alternatively be obtained by: providing a plurality of M>1 litz wire strands preferably having at least essentially identical length, arranging the strands at least essentially parallel to one another, in particular to form a joint strand, and at least partially coiling up or winding up at least a portion of the arrangement of strands, in particular the joint strand. The plurality of strands forming the arrangement and/or the joint strand may be intertwined, braided, plaited and/or otherwise twisted together. The plurality of strands forming the arrangement and/or the joint strand may also be aligned, in particular in or with respect to a longitudinal direction. Each wound up or coiled up strand in the arrangement or joint strand, or portion thereof, thus forms a winding with a first termination and a second termination, with the strand or portion thereof representing the conductor.

Irrespective of whether conductive foil or litz wire is used in forming the coil, the coil may be formed separately from the transformer core, with a central opening as exemplary described above in connection with a coil made using conductive foil. The coil may then subsequently be fit over a first section, in particular a straight section, of the core, in particular a limb, so that it will surround said first section. The coil may be formed on some kind of support, preferably made of electrically insulating material, e.g., plastics, in which the central opening is formed and/or defined. Alternatively, the coil may be formed by coiling, in particular wrapping, the conductive foil, in particular the stack of foil strips as described above, or the arrangement of strands of litz wire, in particular the joint strand, around and/or onto the first section of the core, wherein an electric insulation, in particular a medium- and/or high voltage insulation may be provided between the resulting coil and the core.

Once the coil has been formed, in particular as described above, an electric insulation, in particular a solid or liquid insulation as described above, needs to be applied.

Once the stack of foil strips or arrangement of litz wires is coiled up, scrolled up, rolled up or wound up, the coil thus obtained may be cast into an electrically insulating material, which may subsequently be cured, e.g. by polymerization, in particular a resin. The (cured) electrically insulating material will thus constitute an electric insulation, in particular medium voltage insulation, surrounding at least the coil. The first and second terminations of each winding will thus be located within and/or at an inside of the electric insulation. Prior to or after being cast into the electric insulating material, the coil may be positioned to surround first section of the core as described above.

The coil may alternatively be immersed and/or submerged in an electrically insulating liquid, in particular an electrically insulating oil, contained in a tank, vessel or other kind of container. In this case, the entire transformer including both a primary side and a secondary side, with windings of a coil as described as above provided on at least one of the primary or secondary sides, may be immersed and/or submerged, in particular after the coil has been positioned to surround first section of the core. The electrically insulating liquid will thus constitute an electric insulation, in particular medium voltage insulation, surrounding at least the coil, and, if applicable, the entire transformer. Again, the first and second terminations of each winding will thus be located within and/or at an inside of the electric insulation.

A plurality of M first terminals may be provided outside of the electric insulation, in particular on an outside of the electric insulation. A plurality of M first connectors may be provided, and each of said first terminals may be connected to one of the first terminations by one of the first connectors, such that each first terminal is connected to a different one of the first terminations.

The plurality of M first connectors may extend through a first channel, in particular a single, common first channel that extends from an outside of the electric insulation into and at least partially trough said electric insulation, in particular to a location near the first terminations. The first channel may in particular extend from an outside of the electric insulation to a space or cavity defining or forming an interior of the insulation, within which interior the first terminations are located.

In the case of a solid insulation, the first channel may simply be provided in form of a passage, in particular an at least essentially cylindrical passage extending at least partially trough said solid insulation. In addition, a bushing may be provided within said passage, wherein said bushing may at least essentially be of tubular shape, and may be provide medium- and/or high voltage insulation, i.e. may be configured to withstand a voltage of above to 500V, 1000V, 2500V, or 10 kV across a wall defining said tubular shape, wherein said wall may surround at least a section of the first channel. The bushing may also be provided in form of a stub formed integrally with the electric insulation surrounding the coil.

In the case of a liquid insulation, such a bushing may be provided within a through-hole provided in the tank, vessel or other container containing the electrically insulating liquid.

Within the first channel, the connectors are electrically insulated against one another by a low voltage insulation, in particular by a low voltage only insulation. Such low voltage insulation may be configured to withstand a voltage of up to 50V, 100V, 250V or 500V across the electric insulation, in particular across a thickness of the insulation. The low voltage insulation may in particular be configured to not withstand any voltages, in particular medium or high voltages, i.e. electrical breakdown and/or dielectric breakdown will occur at least with a high probability, in particular a probability of above 20%, 50%, 80% or 90% when voltages above 50V, 100V, 250V or 500V, in particular substantially larger than 50V, 100V, 250V or 500V are applied across the electric insulation, in particular across the thickness of the insulation.

By providing low voltage only insulation only between the connectors in a region of the channel, in particular within the first channel, the electric insulation of the coil can be maintained simple and compact, in particular in the case of larger values of M, in particular for M>3, M>5 or M>10. In combination with the possibility to provide impedance elements outside of the electric insulation, this allows for transformers, in particular medium frequency transformers, in particular for resonant DC/DC converters or dual active bridge DC/DC converters for applications as described above, to be manufactured without significant increase in complexity, and without decrease in reliability. No adaptation, at least on a significant or relevant scale, of manufacturing processes used for producing transformers, in particular medium frequency transformers, without parallel windings is required.

As already indicated above, the second terminations may be connected to one another inside or within the electric insulation, in particular by a connection to the second connector. A second terminal may then be provided outside of the electric insulation, in particular on an outside of the electric insulation. A second connector, in particular a single second connector, may be provided to connect the second terminal with the electrically connected second terminations. The second connector may extend through a second channel, in particular a single, common second channel that extends from an outside of the electric insulation into and at least partially trough said electric insulation, in particular to a location near the second terminations. The second channel may in particular extend from an outside of the electric insulation to a space or cavity defining or forming an interior of the insulation, within which interior the second terminations are located.

By connecting the second terminations to one another inside or within the electric insulation, efficiency of production, compactness and reliability of a transformer in accordance with some of the invention embodiments may be even further increased.

The first and/or second connectors may be formed by litz wire, in particular by sheathed or clad litz wire, wherein an insulating sheath or cladding my provide for low voltage electric insulation of each connector, but may not provide for medium or high voltage insulation. In the case of a coil formed by litz wire, in particular as detailed, the connectors may be formed integrally with the windings, in particular from the same strands of litz wire. A thickness of the sheath or cladding is preferably below 5 mm, below 2.5 mm, below 1 mm, or below 0.5 mm. The sheath and or cladding may then provide, in particular exclusively provide, the low voltage insulation between the plurality of connectors in the first and/or second channel.

The aspects as described above as well as further aspects of the invention will become apparent from and elucidated with reference to the embodiments described hereinafter.

BRIEF DESCRIPTION OF THE DRAWINGS

The subject matter will be explained in more detail in the following text with reference to exemplary embodiments which are illustrated in the attached drawings.

In principle, identical reference symbols in the figures denote identical features or elements.

DETAILED DESCRIPTION

Figure 1:
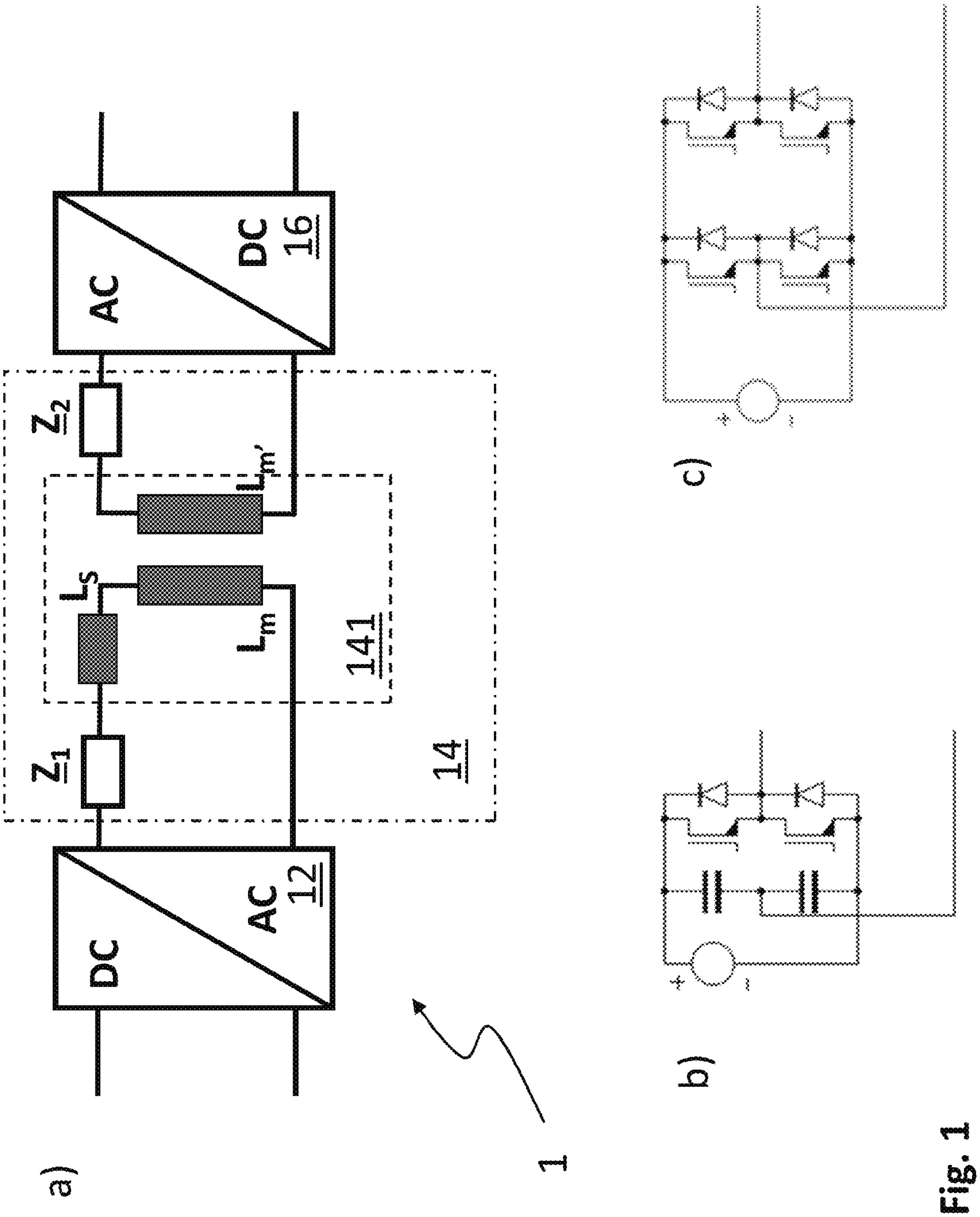
FIG. 1 illustrates a basic, generic, prior art DC/DC converter.

For background information, FIG. 1*a*) illustrates a basic, generic, prior art DC/DC converter 1 as part of which the present invention may be used. A DC/AC converter 11 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 12 comprising a transformer 141, in particular a medium frequency transformer (MFT), said transformer comprising a primary and a secondary side, and providing galvanic insulation between said sides. The transformer may, inter alia, be characterized by coupled inductances $L_m$ and $L_m'$ and a stray inductance $L_s$, with its primary side winding or windings connected to the DC/AC converter via an inductance element having an impedance $Z_1$, which may also be a parasitic inductance, in particular of a wire or other connection. The transformer transforms voltage and/or current at its primary side in a known manner to a secondary side voltage and/or current. Said secondary side voltage and/or current is subsequently converted by AC/DC converter 16, in particular a rectifier, into a DC voltage and/or current at the output of said AC/DC converter 16. DC/AC converter 12 may, in particular, comprise a plurality of semiconductor switches arranged in a half-bridge configuration as shown in FIG. 1*a*, or arranged in a full-bridge configuration as shown in FIG. 1*b*). Likewise, AC/DC converter 16 may, in particular, comprise a plurality of semiconductor switches arranged in a half-bridge configuration corresponding to the one shown in FIG. 1*a*, or arranged in a full-bridge configuration corresponding to the one shown in FIG. 1*c*).

Figure 2:
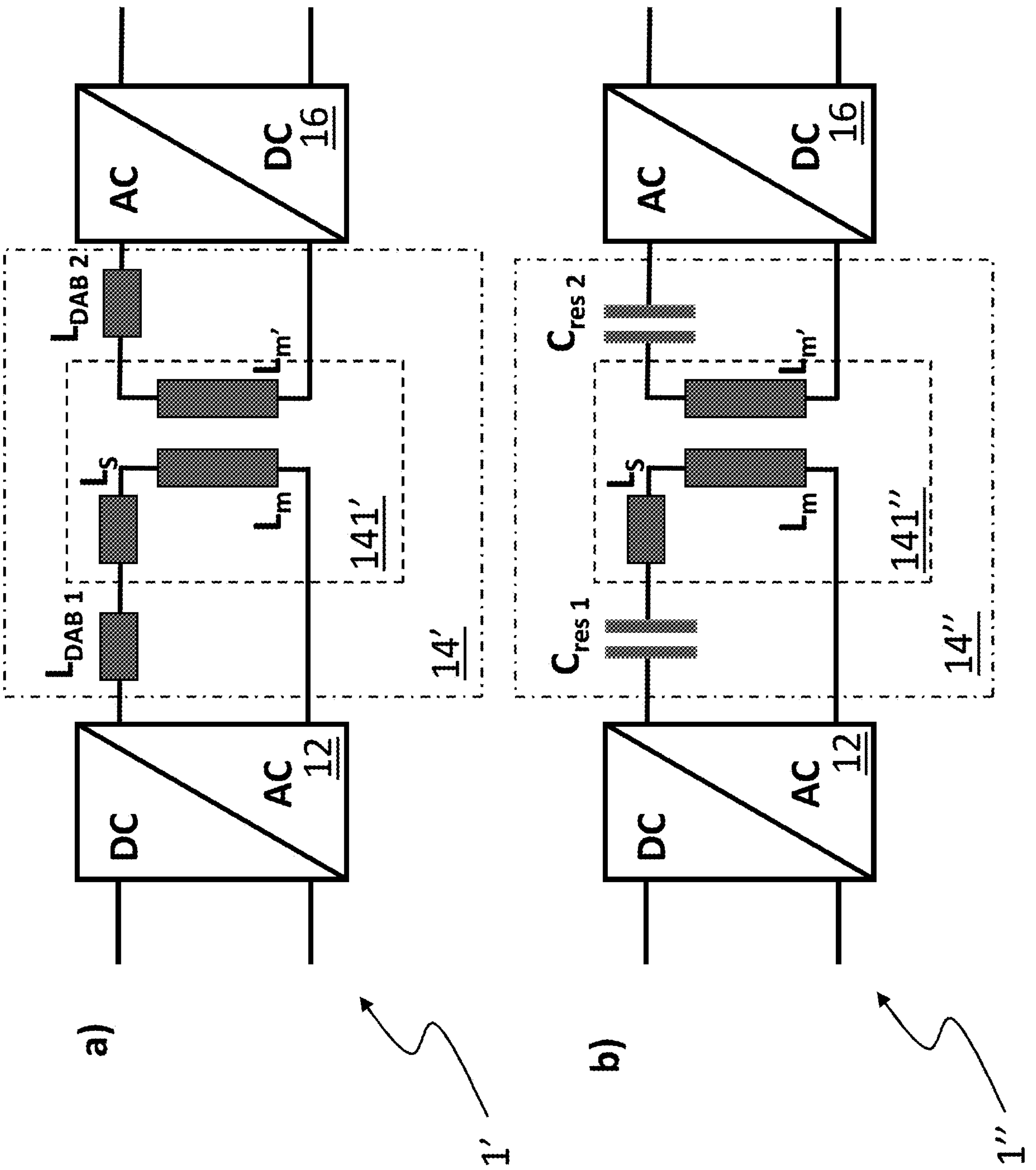
FIG. 2*a*) illustrates a basic, prior art DC/DC dual active bridge (DAB) converter.
FIG. 2*b*) illustrates a basic, prior art resonant DC/DC converter.

FIG. 2*a*) illustrates a basic, prior art DC/DC dual active bridge (DAB) converter 1' which may be considered as an embodiment of the DC/DC converter 1 shown in FIG. 1*a*), and as another potential starting point for the present invention. DC/AC converter 11 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14' comprising a transformer 141', in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via an inductor as impedance element, with said inductor, sometimes referred to as an energy transfer inductor, having an inductance $L_{DAB\ 1}$. The transformer transforms voltage and/or current at its primary side in a known manner to a secondary side voltage and/or current. Said secondary side voltage and/or current is subsequently converted by AC/DC converter 16', in particular a rectifier, into a DC voltage and/or current at the output of said AC/DC converter 16. An optional inductor connected between the secondary side of the transformer and the AD/DC converter preferably has an inductance $L_{DAB\ 2}$ which preferably is at least essentially identical to $L_{DAB\ 1}$. DC/AC converter 12 may, in particular, comprise a plurality of semiconductor switches arranged in a half-bridge configuration corresponding to the one shown in FIG. 1*b*), or arranged in a full-bridge configuration corresponding to the one shown in FIG. 1*c*). Likewise, AC/DC converter 16 may, in particular, comprise a plurality of semiconductor switches arranged in a half-bridge configuration corresponding to the one shown in FIG. 1*b*), or arranged in a full-bridge configuration corresponding to the one shown in FIG. 1*c*). Dual active bridge converters are also exemplary described in Swiss patent application publication CH 707 533 A2 or US patent application publication US 2018/0159435 A1.

FIG. 2*b*) illustrates a basic, prior art resonant DC/DC converter 1" which may be considered as another embodiment of the DC/DC converter 1 shown in FIG. 1*a*), and as yet another potential starting point for the present invention. DC/AC converter 11 is configured to convert a DC voltage and/or current from a DC source, preferably comprising a DC link capacitor, connected to its input into an AC voltage and/or current of medium frequency, i.e. preferably in a frequency range between 500 Hz and 500 kHz. Said AC voltage and/or current is fed into an AC intermediate circuit 14" comprising a transformer 141", in particular a medium frequency transformer (MFT), said transformer comprising a primary and a secondary side, and providing galvanic insulation between said sides. The transformer may, inter alia, be characterized by coupled inductances $L_m$ and $L_{m'}$ and a stray inductance $L_s$, with its primary side winding or windings connected to the DC/AC converter via capacitor as impedance element, with said capacitor having a capacitance $C_{res1}$. The capacitor together with the stray inductance is part of a resonant tank comprised by the AC intermediate circuit, which may store electric energy, and which is characterized by a resonance frequency, which in turn depends on the values of $L_s$ and $C_{res1}$. The capacitor is therefore commonly referred to as a resonant capacitor. The transformer transforms voltage and/or current at its primary side in a known manner to a secondary side voltage and/or current. Said secondary side voltage and/or current is subsequently converted by AC/DC converter 16, in particular a rectifier, into a DC voltage and/or current at the output of said AC/DC converter 16. DC/AC converter 12 may, in particular, comprise a plurality of semiconductor switches arranged in a half-bridge configuration corresponding to the one shown in FIG. 1*b*), or arranged in a full-bridge configuration corresponding to the one shown in FIG. 1*c*). Likewise, AC/DC converter 16 may, in particular, comprise a plurality of semiconductor switches arranged in a half-bridge configuration corresponding to the one shown in FIG. 1*b*), or arranged in a full-bridge configuration corresponding to the one shown in FIG. 1*c*). As an alternative to the variant comprising active bridges as described above and allowing for bi-directional electric power flow, AC/DC converter 16 may, in particular, be embodied without semiconductor switches and comprise diodes only arranged in a half-bridge or full-bridge configuration if only unidirectional electric power flow is required. Resonant DC/DC converters are exemplary described in PCT patent application publication WO 2018/141092 A1.

Figure 3:
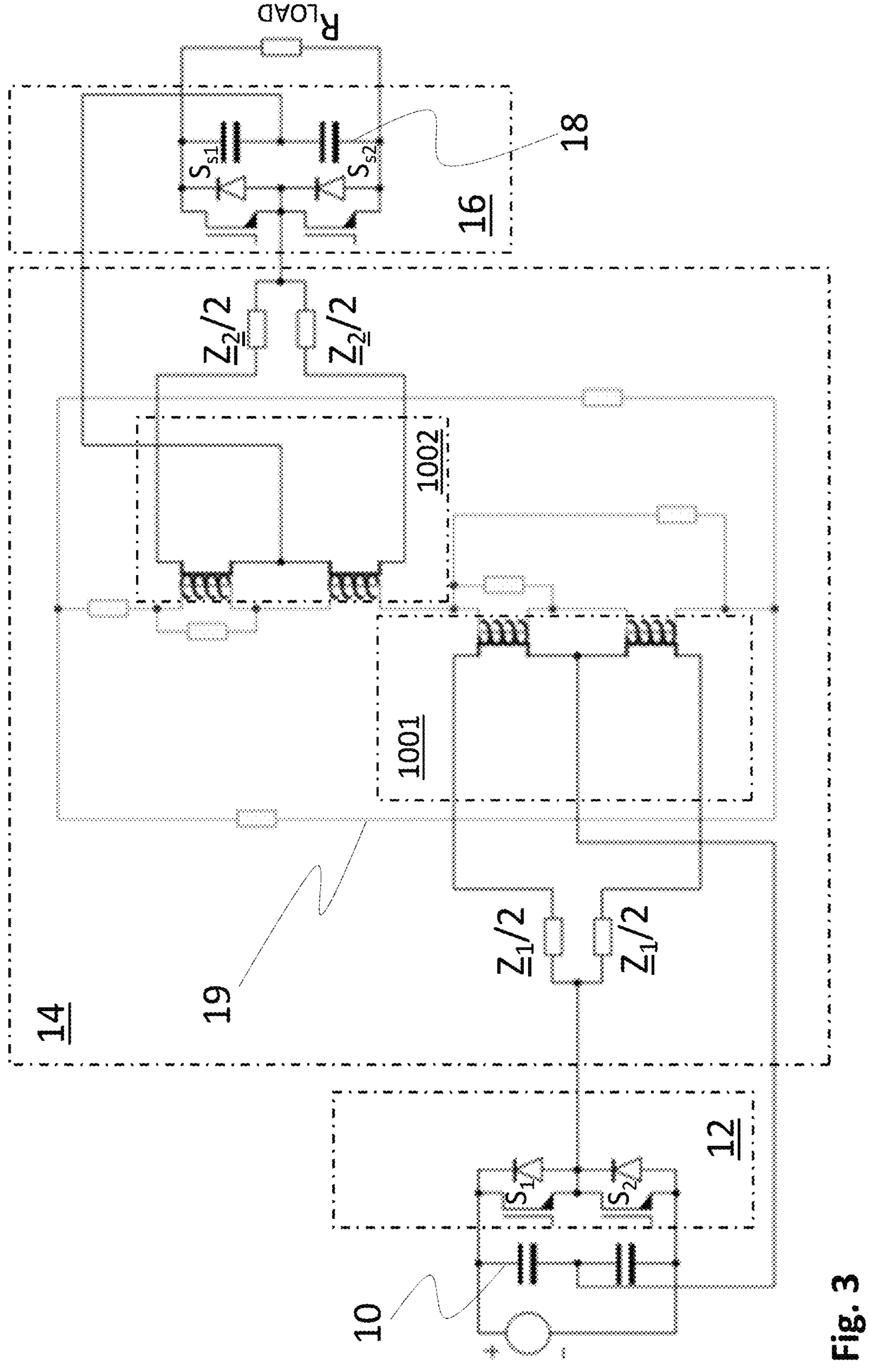
FIG. 3 shows a more detailed schematic of one possible embodiment of the DC/DC converter from FIG. 1.

FIG. 3 shows a more detailed schematic of one possible embodiment of the DC/DC converter from FIG. 1*a*), where two parallel windings are provided on both the primary side 1001 and the secondary side 1002 of the transformer, and impedance elements $Z_1$ and $Z_2$ have been split and distributed between the parallel windings. Also shown, merely for background information, is a voltage source connected to the first DC link 10, a resistive load connected to the second DC link 18 and characterized by a resistance $R_{load}$, and (in gray) a reluctance network 19 of a core and a stray flux of the transformer.

Figure 4:
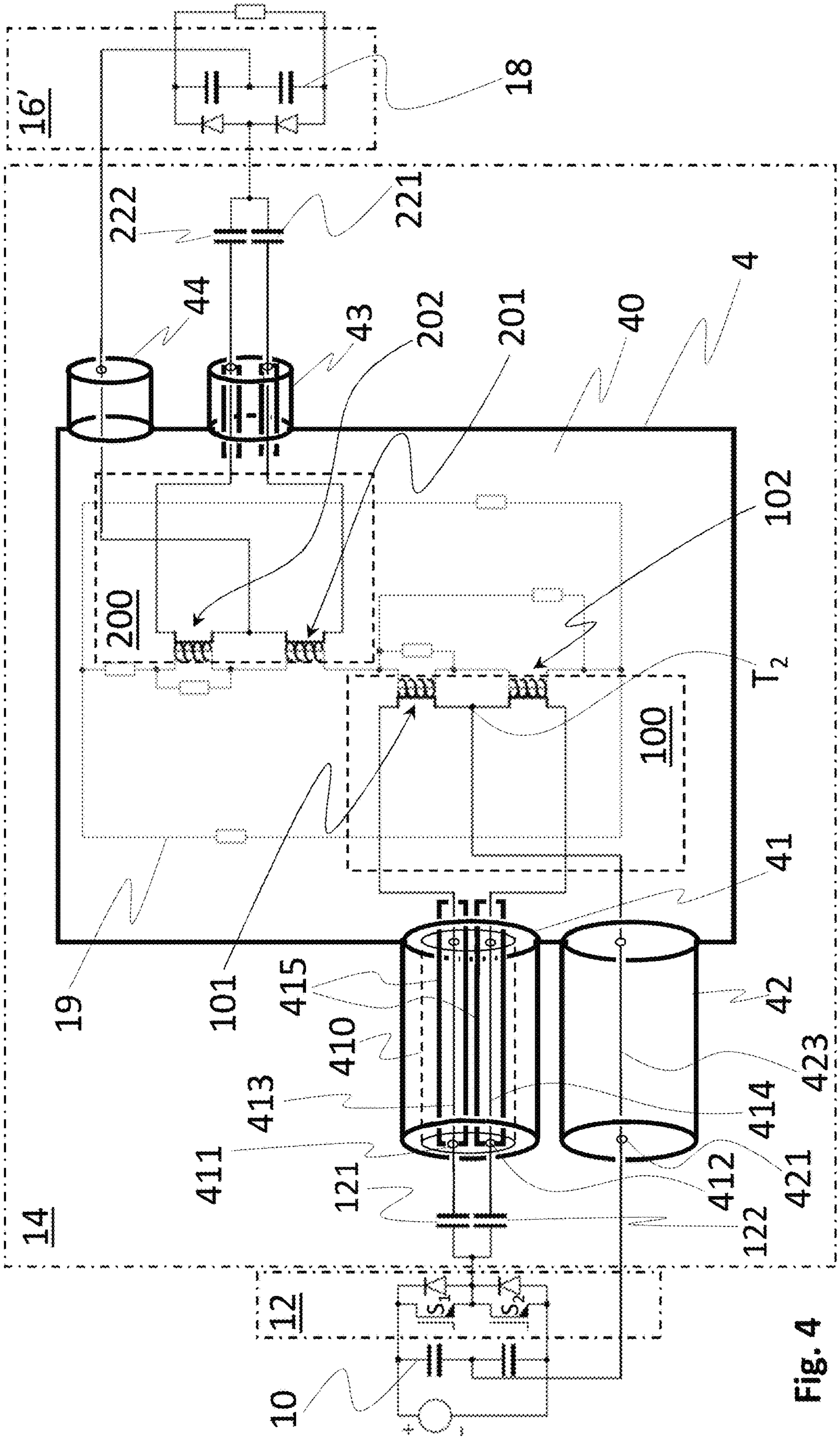
FIG. 4 schematically illustrates a transformer in accordance with the invention.

FIG. 4 schematically illustrates a transformer in accordance with various embodiments employed in an exemplary resonant DC/DC converter as an embodiment of the DC/DC converter from FIG. 3. A first coil 100 on a primary side of the transformer comprises a pair of M=2 first windings 101, 102, and a pair of first capacitors 121, 122, with each first capacitor being connected in series with a respective one of the first windings. The transformer is immersed in an electrically insulating oil 40 contained in a tank 4. First and second bushings 41 and 42 are arranged in a wall of the tank to allow for electric connection to the first coil being established in a simple, secure, and reliable manner. A pair of first terminals 411, 412 is provided on an end of the first bushing facing away from the tank, wherein each first terminal may, in particular, allow for cable shoes to be attached. Two first connectors 413, 414 connect first terminals 411, 412 to first terminations of coils 101, 102, respectively. The first connectors extend through a first channel 410 provided in first bushing 41. Second terminations of the first windings 101, 102 are connected together inside the insulating oil 40 an thus within tank 4 at node $T_2$. A second terminal 421 is provided on an end of the second bushing 42 facing away from the tank, wherein the second terminal may, in particular, allow for cable shoes to be attached. A single second connector 423 connects second terminal 421 to node $T_2$. A second coil 200 on a secondary side of the transformer also comprises a pair of M=2 second windings 201, 202, and a pair of second capacitors 221, 222, with each second capacitor being connected in series with a respective one of the second windings 201, 202. Third and fourth bushings 43 and 44 are provided, which are at least essentially identical to first and second bushings 41 and 42, respectively; and arranged in an at least essentially analogous manner to allow for electric connection to the second coil being established in a correspondingly simple, secure, and reliable manner.

Unless specified otherwise, a connection, in particular between any two entities, including in particular nodes, points, terminals, elements, devices, etc. or combinations thereof, may refer to an electrically conductive connection, as in particular established by a wire, cable, busbar, a conductive track, trace or line on e.g. a (printed) circuit board, solder, etc. The electrically conductive connection is preferably at least substantially direct, in particular without any discrete elements, as, in particular, resistors, capacitors, inductors, or other passive or active elements or devices connected between the connected entities. The electrically conductive connection thus has at least essentially negligible resistance, capacitance and inductance, preferably at least essentially zero resistance, capacitance and inductance. In particular, resistance, capacitance and inductance of the electrically conductive connection are exclusively parasitic by nature. Further, resistance, capacitance and inductance of the electrically conductive connection significantly smaller (preferably by a factor of 1/100, 1/1000 or 1/10000) than resistances, capacitances and impedances of resistors, capacitors or inductors, respectively, connected by the electrical conductive connection, and/or comprised by an electric circuit or network which comprises the electrically conductive connection.

Unless specified otherwise, an electric connection or electrical connection is identical to connection as defined above.

Unless specified otherwise, if two entities, including in particular nodes, points, terminals, elements, devices, etc. or combinations thereof, are said to be connected, electrically connected or to be (electrically) connected together, a connection as defined above exists between the two entities.

Unless specified otherwise, if a first and a second entity, including in particular a first and second node, point, terminal, element, device, etc. or combinations thereof, are said to be connected via a third entity, including in particular a third node, point, terminal, element, device, or with such a third entity (in) between, a connection as described above exists between the first and third entities as well as between the third and second entities. However, no connection as described above, in particular no at least substantially direct connection exists between the first and second entities. If explicitly specified, the third element may in particular also be a connection, in particular a conductor, wire, cable, busbar etc. In such case, it may be assumed that no connection as described above other than the specified one is present.

Unless stated otherwise, it is assumed that throughout this patent application, a statement $a \approx b$ implies that $|a-b|/(|a|+|b|)<10$, preferably $|a-b|/(|a|+|b|)<100$, wherein a and b may represent arbitrary variables as described and/or defined anywhere in this patent application, or as otherwise known to a person skilled in the art. Further, a statement that a is at least approximately equal or at least approximately identical to b implies that $a \approx b$, preferably $a=b$. Further, unless stated otherwise, it is assumed that throughout this patent application, a statement $a \gg b$ implies that $a>10b$, preferably $a>100b$; and statement $a \ll b$ implies that $10a<b$, preferably $100a<b$. Further, unless stated otherwise, it is assumed that throughout this patent application, a statement that $a \gg b$, or that a is significantly larger or much larger than b, implies that $a>10b$, preferably $a>100b$; and statement that $a \ll b$, or that a is significantly smaller or much smaller than b implies that $10a<b$, preferably $100a<b$. Further, a statement that two values a and b substantially deviate from one another, or differ significantly, implies that $a \approx b$ does not hold, in particular that $a \gg b$ or $a \ll b$.

This description and the accompanying drawings that illustrate aspects and embodiments of the present disclosure should not be taken as limiting the claims defining the protected subject matter. In other words, while the subject matter has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the various embodiments. Thus, it will be understood that changes and modifications may be made by those of ordinary skill within the scope of the following claims. In particular, the present invention covers further embodiments with any combination of features from different and/or individual embodiments as described above and below. Embodiments in accordance with the invention may, in particular, include further and/or additional features, elements, aspects, etc. not shown in the drawings or described above.

Method steps listed in the description and, in particular, in the claims, are preferably carried out in the order as listed, but may alternatively be carried out in any other order in as far as technically and practically feasible.

The disclosure also covers all further features shown in the Figures, individually, although they may not have been described in the afore or following description. Also, individual alternatives of the embodiments described in the Figure and the description and individual alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude further or additional features, elements, steps etc., and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute, property or a value particularly also comprise exactly the attribute, property or value, respectively, as stated. The term "approximately" or "about" in the context of a given numerate value or range refers to a value or range that is, e.g., within 20%, within 10%, within 5%, or within 2% of the given value or range, and, in particular, also comprises the exact value or range as stated. Components described as coupled or connected may be electrically or mechanically directly coupled, or they may be indirectly coupled via one or more intermediate components. Any reference signs in the claims shall not be construed as limiting the scope.

Further embodiments of the various embodiments are disclosed in the following aspects:

1) A transformer, in particular a medium frequency transformer for a resonant DC/DC converter (1") or a dual active bridge DC/DC converter (1'), comprising,
   a) a core, in particular a core having an air gap;
   b) a first coil (100) surrounding a first section of the core;
   c) an electric insulation, in particular a medium voltage electric insulation (40), surrounding the first coil;
   d) wherein the first coil comprises a plurality of M first windings (101, 102);
   e) each of the plurality of M first windings comprising
      i) a first termination and a second termination,
      ii) a conductor wound around the first portion of the core in at least one turn between the first and second termination,
   f) a plurality of M first terminals (411, 412) provided outside of the insulation, each of said first terminals connected to a different one of the first terminations by one of a plurality of M first connectors (413, 414), thus connecting each first terminal to a respective first termination; the transformer further comprising:
   g) a first channel (410) extending from an outside of the electric insulation into and at least partially through said electric insulation, wherein the plurality of M first connectors extend through the first channel; wherein
   h) the plurality of M first connectors are insulated against one another by means of a low voltage insulation (415) within the channel, and wherein preferably no medium voltage and/or high voltage insulation is present between any two of the first connectors.
2) The transformer according to aspect 1, wherein
   a) the second terminations are connected to one another within or inside the electric insulation;
   b) a second terminal (421) is provided outside of the electric insulation, and connected to the second terminations by a second connector (423).
3) The transformer according to aspect 1, further comprising
   a) a plurality of M second terminals provided outside of the electric insulation, each of said second terminals connected to a different one of the second terminations by one of a plurality of M second connectors, thus connecting each second terminal to a respective second termination; the transformer further comprising:
   b) a second channel extending from an outside of the electric insulation into and at least partially through said electric insulation, wherein the plurality of M second connectors extend through the second channel; wherein
   c) the plurality of M second connectors are insulated against one another by means of a low voltage insulation within the channel, and wherein preferably no medium voltage and/or high voltage insulation is present between any of the second connectors.
4) The transformer according to one of the preceding aspects, wherein a wall surrounding the first and/or second channel provides medium or high voltage insulation, in particular a medium or high voltage insulation of first and/or second connectors (413, 414, 423) against the electrical insulation.
5) The transformer according to one of the preceding aspects, wherein the electric insulation comprises an electrically insulating fluid, in particular oil, in a tank (4), vessel or other container in which fluid the first coil (100), preferably the entire transformer, is immersed, and wherein the first channel is provided in a bushing extending through a wall of the container and at least partially into the fluid.
6) The transformer according to one of aspects 1 to 4, wherein the electric insulation is cast around the coil (100).
7) The transformer according to one of the preceding aspects, wherein each of the first and/or second connectors (413, 414, 423) comprises litz wire, in particular is made from litz wire.
8) The transformer according to one of the preceding aspects, wherein the conductors of each winding (101, 102) are formed by litz wire, and wherein each of the first and/or second connectors (413, 414, 423) is integrally formed with the conductor it connects to by the same litz wire, in particular as a single strand of litz wire.
9) The transformer according to the aspect 7 or 8 wherein the litz wire comprises an insulating sheath or cladding, preferably extending at least essentially along its entire length, said insulating sheath or cladding providing low voltage insulation, and preferably not providing medium voltage and/or high voltage insulation, an wherein a thickness of the insulating sheath or cladding is preferably below 5 mm, below 2.5 mm, below 1 mm, or below 0.5 mm.
10) The transformer according to one of the preceding aspects, wherein the first channel (410) extends at least approximately in a direction perpendicular to the first section of the core, and/or at least approximately in a direction perpendicular to a longitudinal direction as defined by the windings (101, 102) and/or the first coil (100).
11) The transformer according to one of the preceding aspects, further comprising a) a second coil (200) surrounding the first or a second section of the core;
   b) an electric insulation, in particular a medium voltage electric insulation (40), surrounding the second coil;
   c) wherein the second coil comprises a plurality of M' second windings (201, 202);
   d) each of the plurality of M' second windings comprising
      i) a third termination and a fourth termination,
      ii) a conductor wound around the first or the second portion of the core in at least one turn between the third and the fourth termination,
   e) a plurality of M' third terminals provided on an outside of the insulation, each of said third terminals connected to a different one of the third terminations by one of a plurality of M' third connectors, thus connecting each third terminal to a respective third termination; the transformer further comprising:
   f) a third channel extending from an outside of the electric insulation into and at least partially through said electric insulation, wherein the plurality of M' third connectors extend through the third channel; wherein g) the plurality of M' third connectors are insulated against one another by means of a low voltage insulation within the third channel, and wherein preferably no medium voltage and/or high voltage insulation is present between any two of the third connectors.

12) The transformer according to one of the preceding aspects, wherein the first windings (101, 102) form a primary winding of the transformer, and the second windings (201, 202) form a secondary winding of the transformer.

13) The transformer according to one of aspects 11 or 12, wherein the first coil (100) and the second coil (200) both surround the first section of the core, in particular in an at least essentially a co-axial arrangement.

14) The transformer according to one of aspects 11 to 13, wherein the first coil surrounds the second coil, or vice versa.

15) The transformer according to one of the preceding aspects, wherein the first coil comprises a) a pair of windings (101, 102), said pair of windings comprising:

i) a first winding (101) made of a first conductive foil strip (111, 111', 111") and comprising a first plurality of turns surrounding one another;

ii) a second winding (102) made of a second conductive foil strip (112, 112', 112") and comprising a second plurality of turns surrounding one another, with each turn of the first plurality of turns adjacently surrounded by a turn of the second plurality of turns; wherein iii) innermost endings of the first and second winding form the second terminations of the respective winding;

iv) outermost endings of the first and second winding form the first terminations of the respective winding.

The invention claimed is:

1. A medium frequency transformer for a resonant DC/DC converter or a dual active bridge DC/DC converter, comprising:

a core having an air gap;

a first coil surrounding a first section of the core;

a medium voltage electric insulation surrounding the first coil;

wherein the first coil comprises a plurality of M first windings;

each of the plurality of M first windings comprising:

a first termination and a second termination, and a conductor wound around the first portion of the core in at least one turn between the first and second termination;

a plurality of M first terminals provided outside of the medium voltage electric insulation, each of said first terminals connected to a different one of the first terminations by one of a plurality of M first connectors, thus connecting each first terminal to a respective first termination; the transformer further comprising:

a first channel extending from an outside of the medium voltage electric insulation into and at least partially through said medium voltage electric insulation, wherein the plurality of M first connectors extend through the first channel; wherein the plurality of M first connectors are insulated against one another by means of a low voltage electric insulation within the channel, and wherein no medium voltage and/or high voltage insulation is present between any two of the first connectors;

the second terminations are connected to one another within or inside the medium voltage electric insulation; and a second terminal is provided outside of the medium voltage electric insulation, and connected to the second terminations by a second connector.

2. The transformer according to claim 1, further comprising:

a plurality of M second terminals provided outside of the medium voltage electric insulation, each of said second terminals connected to a different one of the second terminations by one of a plurality of M second connectors, thus connecting each second terminal to a respective second termination; the transformer further comprising:

a second channel extending from an outside of the medium voltage electric insulation into and at least partially through said medium voltage electric insulation, wherein the plurality of M second connectors extend through the second channel;

wherein the plurality of M second connectors are insulated against one another by means of a low voltage electric insulation within the channel, and wherein no medium voltage and/or high voltage insulation is present between any of the second connectors.

3. The transformer according to claim 1, wherein a wall surrounding the first and/or second channel provides medium or high voltage insulation of first and/or second connectors against the medium voltage electrical insulation.

4. The transformer according to claim 1, wherein the medium voltage electric insulation comprises an electrically insulating fluid in a tank, vessel or other container in which fluid the first coil is immersed, and wherein the first channel is provided in a bushing extending through a wall of the container and at least partially into the fluid.

5. The transformer according to claim 1, wherein the medium voltage electric insulation is cast around the coil.

6. The transformer according to claim 1, wherein each of the first and/or second connectors is made from litz wire.

7. The transformer according to claim 1, wherein the conductors of each winding are formed by litz wire, and wherein each of the first and/or second connectors is integrally formed with the conductor it connects to by the same litz wire.

8. The transformer according to claim 7 wherein the litz wire comprises an insulating sheath or cladding, extending at least essentially along its entire length, said insulating sheath or cladding providing low voltage insulation, and not providing medium voltage and/or high voltage insulation.

9. The transformer according to claim 1, wherein the first channel extends at least approximately in a direction perpendicular to the first section of the core, and/or at least approximately in a direction perpendicular to a longitudinal direction as defined by the windings and/or the first coil.

10. The transformer according to claim 1, further comprising:

a second coil surrounding the first or a second section of the core;

a medium voltage electric insulation surrounding the second coil;

wherein the second coil comprises a plurality of M' second windings;

each of the plurality of M' second windings comprising:

a third termination and a fourth termination, a conductor wound around the first or the second portion of the core in at least one turn between the third and the fourth termination, a plurality of M' third terminals provided on an outside of the medium voltage electric insulation surrounding the second coil, each of said third terminals connected to a different one of the third terminations by one of a plurality of M' third connectors, thus connecting each third terminal to a respective third termination; the transformer further comprising:

a third channel extending from an outside of the medium voltage electric insulation surrounding the second coil into and at least partially through said medium voltage electric insulation, wherein the plurality of M' third connectors extend through the third channel; wherein the plurality of M third connectors are insulated against one another by means of a low voltage electric insulation within the third channel, and wherein no medium voltage and/or high voltage insulation is present between any two of the third connectors.

11. The transformer according to claim 10, wherein the first windings form a primary winding of the transformer, and the second windings form a secondary winding of the transformer.

12. The transformer according to claim 11, wherein the first coil and the second coil both surround the first section of the core in an at least essentially a co-axial arrangement.

13. The transformer according to claim 10, wherein the first coil surrounds the second coil, or vice versa.

14. The transformer according to claim 10, wherein the plurality of M first windings comprises:

a pair of windings, said pair of windings comprising:

a first winding made of a first conductive foil strip and comprising a first plurality of turns surrounding one another;

a second winding made of a second conductive foil strip and comprising a second plurality of turns surrounding one another, with each turn of the first plurality of turns adjacently surrounded by a turn of the second plurality of turns; wherein innermost endings of the first and second winding form the second terminations of the respective winding; and outermost endings of the first and second winding form the first terminations of the respective winding.

15. The transformer according to claim 6 wherein the litz wire comprises an insulating sheath or cladding extending at least essentially along its entire length, said insulating sheath or cladding providing low voltage insulation, and not providing medium voltage and/or high voltage insulation.

16. The transformer according to claim 10, wherein the first coil and the second coil both surround the first section of the core in an at least essentially a co-axial arrangement.

17. The transformer according to claim 1, wherein the plurality of M first windings comprises:

a pair of windings, said pair of windings comprising:

a first winding made of a first conductive foil strip and comprising a first plurality of turns surrounding one another;

a second winding made of a second conductive foil strip and comprising a second plurality of turns surrounding one another, with each turn of the first plurality of turns adjacently surrounded by a turn of the second plurality of turns; wherein innermost endings of the first and second winding form the second terminations of the respective winding; and outermost endings of the first and second winding form the first terminations of the respective winding.

18. The transformer according to claim 8, wherein a thickness of the insulating sheath or cladding is below 5 mm.

19. The transformer according to claim 15, wherein a thickness of the insulating sheath or cladding is below 5 mm.

* * * * *